United States Patent [19]
Goodwin et al.

[11] Patent Number: 5,619,684
[45] Date of Patent: Apr. 8, 1997

[54] METHOD AND APPARATUS FOR CONSISTENT USER INTERFACE IN A MULTIPLE APPLICATION PERSONAL COMMUNICATIONS DEVICE

[75] Inventors: Julie F. Goodwin, Boca Raton; Debra A. G. Johnson, Fort Lauderdale; James R. Lewis, Coconut Creek; David J. Rasmussen; Byron K. Tiller, both of Boca Raton; Raymond L. Yee, Coral Springs, all of Fla.

[73] Assignee: International Business Machines Corporation, Armonk, N.Y.

[21] Appl. No.: 279,413

[22] Filed: Jul. 25, 1994

[51] Int. Cl.$^6$ .................................................. H04L 12/00
[52] U.S. Cl. .......................................................... 395/500
[58] Field of Search ................ 364/431.04; 340/825.34; 375/267; 378/58, 59; 395/500

[56] References Cited

U.S. PATENT DOCUMENTS

| | | | |
|---|---|---|---|
| 4,521,645 | 6/1985 | Carroll | 179/5 |
| 4,677,653 | 5/1987 | Weiner et al. | 379/58 |
| 4,734,928 | 3/1988 | Weiner et al. | 379/59 |
| 4,843,326 | 6/1989 | Smythe | 324/503 |
| 4,899,377 | 2/1990 | Bauer et al. | 379/354 |
| 4,912,756 | 3/1990 | Hop | 379/60 |
| 4,969,836 | 11/1990 | Magnier et al. | 439/188 |
| 5,020,090 | 5/1991 | Morris | 379/58 |
| 5,099,426 | 3/1992 | Carlgren et al. | 364/419 |
| 5,127,041 | 6/1992 | O'Sullivan | 379/59 |
| 5,146,486 | 9/1992 | Lebowitz | 379/40 |
| 5,183,404 | 2/1993 | Aldous et al. | 439/55 |
| 5,200,991 | 4/1993 | Motoyanagi | 379/61 |
| 5,204,947 | 4/1993 | Bernstein et al. | 395/157 |
| 5,249,218 | 2/1993 | Sainton | 379/59 |
| 5,255,306 | 10/1993 | Melton et al. | 379/38 |
| 5,255,312 | 10/1993 | Koshiishi | 379/100 |
| 5,270,704 | 12/1993 | Sosa Quintana et al. | 340/870.02 |
| 5,272,747 | 12/1993 | Meads | 379/59 |
| 5,274,693 | 12/1993 | Waldman | 379/59 |
| 5,297,030 | 3/1994 | Vassigh et al. | 364/405 |
| 5,297,249 | 3/1994 | Bernstein et al. | 395/156 |
| 5,302,947 | 4/1994 | Fuller et al. | 340/825.34 |
| 5,313,596 | 5/1994 | Swindler et al. | 395/325 |
| 5,446,759 | 8/1995 | Campana, Jr. | 375/267 |

FOREIGN PATENT DOCUMENTS

| | | |
|---|---|---|
| 0481887A2 | 4/1992 | European Pat. Off. . |
| 64-71369 | 3/1989 | Japan . |
| 5-244243 | 9/1993 | Japan . |
| 3703044A1 | 3/1988 | Sweden . |
| 1597163 | 9/1981 | United Kingdom . |

*Primary Examiner*—Kevin J. Teska
*Assistant Examiner*—Dan Fiul
*Attorney, Agent, or Firm*—John Hoel; George E. Grosser

[57] ABSTRACT

An option attach connector has a first indicator bit combination that alerts the device that a public switched telephone network connection has been made to it. The presence of the first indicator bit combination is a signal to the device that telephone, FAX, and E-mail communications applications are to be conducted over a PSTN link. The presence of the first indicator bit combination invokes the stored computer program to display images of menus, keypads, and visual presentations on the LCD display that are consistent with a basic display layout for both cellular telephone network and PSTN modes, but that include customized presentation features that are unique to the PSTN mode of communications. The presence of a second indicator bit combination different from the first indicator bit combination invokes the stored computer program to display corresponding images of menus, keypads, and visual presentations on the LCD display that are consistent with the basic display layout for both cellular telephone network and PSTN modes, but that include customized presentation features that are unique to the cellular telephone network mode of communications.

14 Claims, 16 Drawing Sheets

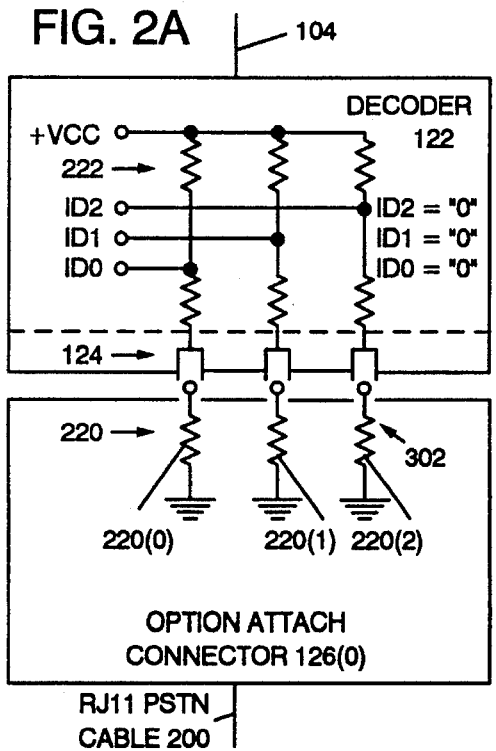
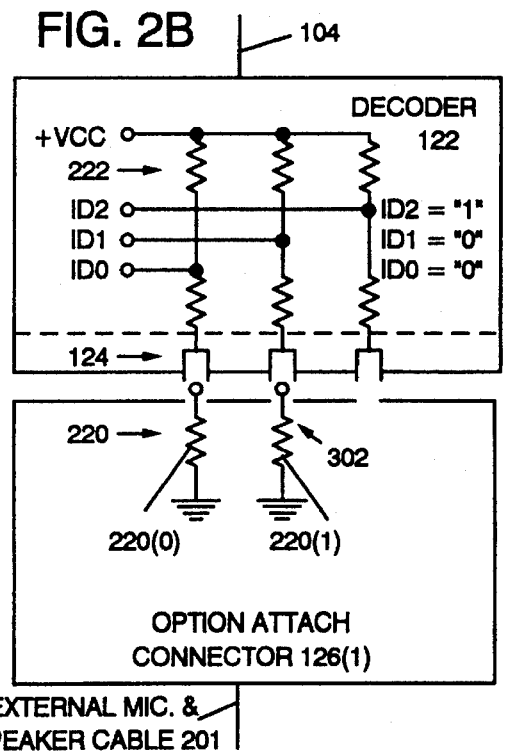
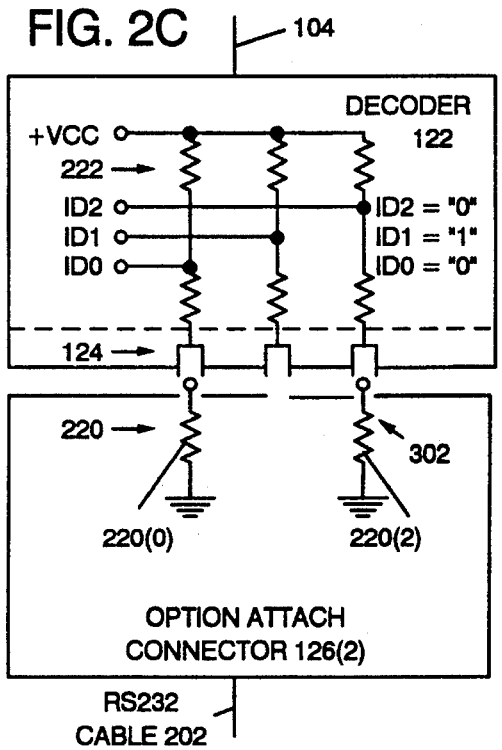
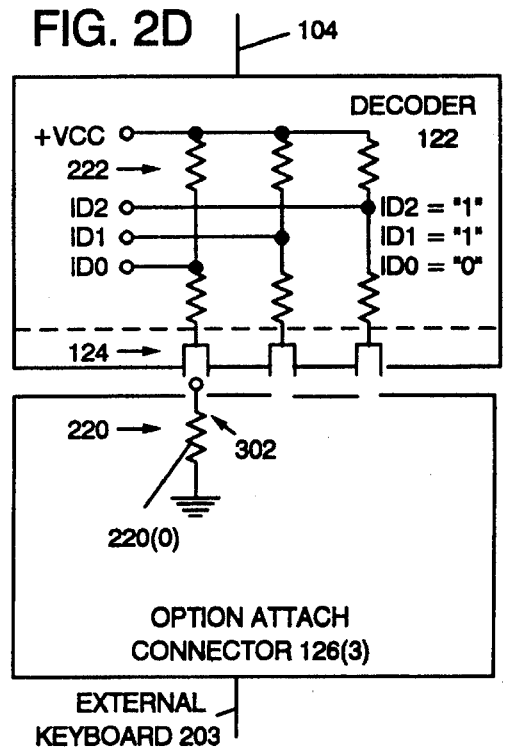

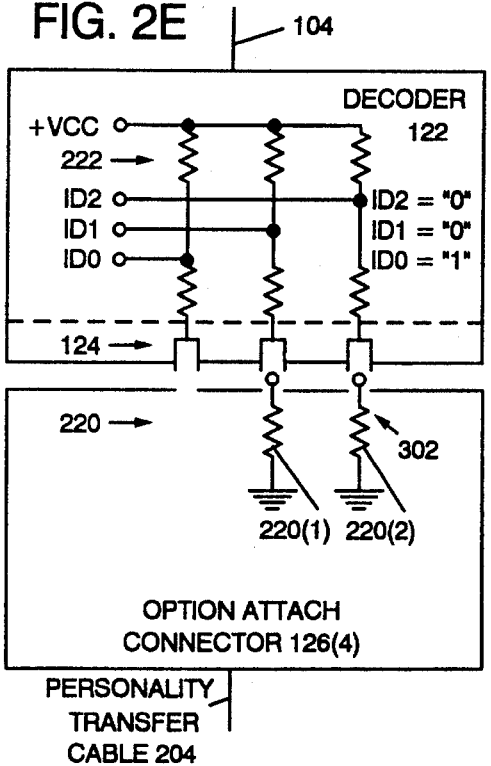
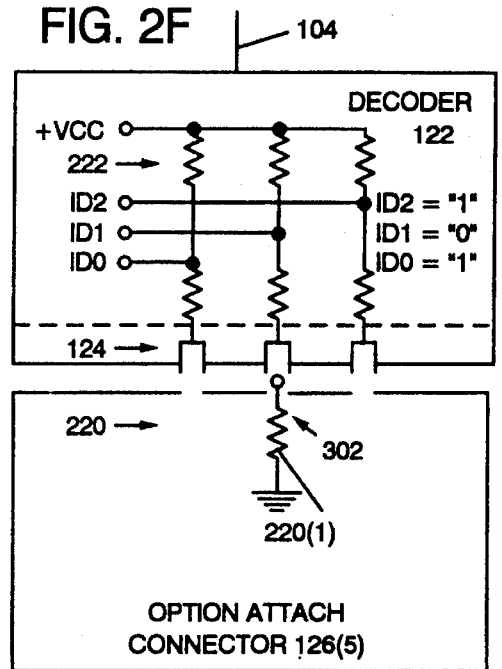
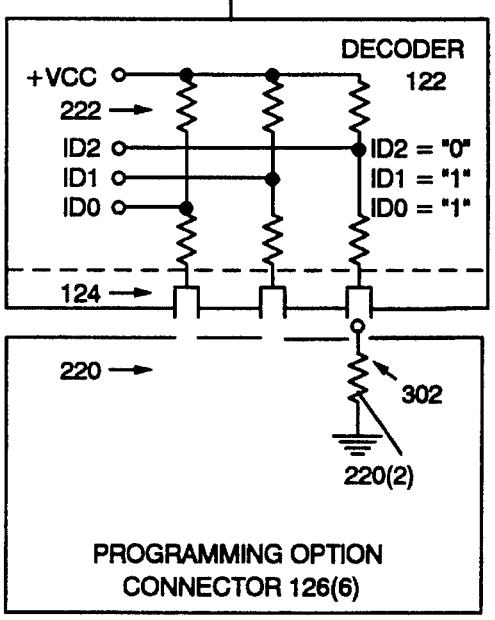
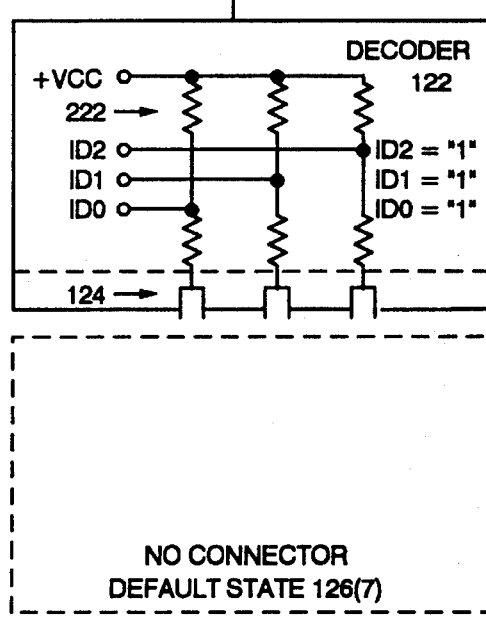

STEP 424: IF OPTION VALUE IN OPTIONS REGISTER = "000" (FIG. 1A) (CORRESPONDING TO PSTN CABLE CONNECTOR 126(0)), THEN CONFIGURE THE AUDIO MUX 160 FOR PATH 60A TO CONNECT EAR PIECE/MICROPHONE 117 FROM LINE 175 TO LINE 174 AND THRU OPTION ATTACH CONNECTOR 126(0) TO THE RJ11 PSTN CABLE 200

STEP 426: ACCESS PSTN SCREEN IMAGE FILE 182 AND DISPLAY PSTN PHONE SCREEN IMAGE 50A ON DISPLAY 112 (FIG. 5A)

STEP 428: IF OPTION VALUE IN OPTIONS REGISTER = "111" (FIG. 1B) (CORRESPONDING TO NO CONNECTOR DEFAULT STATE 126(7)), THEN CONFIGURE THE AUDIO MUX 160 FOR PATH 60B TO CONNECT EAR PIECE/MICROPHONE 117 FROM LINE 175 TO LINE 177 TO CELLULAR TELEPHONE 114

STEP 430: ACCESS CELLULAR SCREEN IMAGE FILE 184 AND DISPLAY CELLULAR PHONE SCREEN IMAGE 50B ON DISPLAY 112 (FIG. 5B)

STEP 432: IF OPTION VALUE IN OPTIONS REGISTER = "001" (FIG. 1E) (CORRESPONDING TO EXTERNAL MICROPHONE AND SPEAKER CONNECTOR 126(1) 126(1)), THEN CONFIGURE THE AUDIO MUX 160 FOR PATH 60E TO CONNECT EXTERNAL MICROPHONE AND SPEAKER CABLE 210 THRU CONNECTOR 126(1) AND LINE 169 TO LINE 177 TO CELLULAR TELEPHONE 114

STEP 434: ACCESS CELLULAR SCREEN IMAGE FILE 184 AND DISPLAY CELLULAR PHONE SCREEN IMAGE 50B ON DISPLAY 112 (FIG. 5B)

FIG. 4D

STEP 460: SELECT E-MAIL RECEIVE FUNCTION FROM MENU ON DISPLAY/TOUCH OVERLAY SCREEN 112 (FIG. 3)

STEP 462: BEGIN INTERFACE PROGRAM 180 TO ACCESS OPTIONS REGISTER 136 (FIG. 1C), CONFIGURE AUDIO MUX, 160 AND DISPLAY SCREEN IMAGE ON DISPLAY 112

STEP 464: IF OPTION VALUE IN OPTIONS REGISTER = "000" (FIG. 1C) (CORRESPONDING TO PSTN CABLE CONNECTOR 126(0)), THEN CONFIGURE THE AUDIO MUX 160 FOR PATH 60C TO CONNECT MODEM 170 FROM LINE 176 TO LINE 174 AND THRU OPTION ATTACH CONNECTOR 126(0) TO THE RJ11 PSTN CABLE 200

STEP 466: ACCESS PSTN SCREEN IMAGE FILE AND DISPLAY PSTN E-MAIL SCREEN IMAGE 50E ON DISPLAY 112 (FIG. 5E)

STEP 468: IF OPTION VALUE IN OPTIONS REGISTER = "111" (FIG. 1D) (CORRESPONDING TO NO CONNECTOR DEFAULT STATE 126(7)), THEN CONFIGURE THE AUDIO MUX 160 FOR PATH 60D TO CONNECT MODEM 170 FROM LINE 176 TO LINE 177 TO CELLULAR TELEPHONE 114

STEP 470: ACCESS CELLULAR E-MAIL SCREEN IMAGE FILE AND DISPLAY CELLULAR E-MAIL SCREEN IMAGE 50F ON DISPLAY 112 (FIG. 5F)

RETURN

MASTER IMAGE 50X

FROM INTERFACE PROGRAM 180

PSTN CUSTOMIZING IMAGE 50Y

FROM PSTN SCREEN FILE 182

CELLULAR CUSTOMIZING IMAGE 50Z

FROM CELLULAR SCREEN FILE 184

METHOD AND APPARATUS FOR CONSISTENT USER INTERFACE IN A MULTIPLE APPLICATION PERSONAL COMMUNICATIONS DEVICE

FIELD OF THE INVENTION

The invention disclose broadly relates to data processing systems and data communications systems and more particularly relates to providing a consistent user interface for such systems.

RELATED PATENT APPLICATIONS

This patent application is related to the copending U.S. patent application Ser. No. 08/279,638, filed Jul. 25, 1994, by David Allard, et al., entitled "FIELD PROGRAMMING APPARATUS AND METHOD FOR UPDATING PROGRAMS IN A PERSONAL COMMUNICATIONS DEVICE", assigned to the IBM Corporation and incorporated herein by reference.

This patent application is also related to the copending U.S. patent application Ser. No. 08/145,914, filed Nov. 1, 1993, by David Allard, et al., entitled "PERSONAL COMMUNICATOR HAVING COLLAPSIBLE KEYBOARD FOR EDITING INFORMATION ON SMALL TOUCH SCREEN DISPLAY", assigned to the IBM Corporation and incorporated herein by reference, now abandoned.

This patent application is also related to the copending U.S. patent application Ser. No. 08/146,341, filed Aug. 29, 1995, by David Allard, et al., entitled "PERSONAL COMMUNICATOR HAVING IMPROVED ZOOM AND PAN FUNCTIONS FOR EDITING INFORMATION ON TOUCH SENSITIVE DISPLAY", assigned to the IBM Corporation and incorporated herein by reference, now abandoned.

This patent application is also related to the copending U.S. patent application Ser. No. 08/146,342, filed Jun. 6, 1995, by David Allard, et al., entitled "PERSONAL COMMUNICATOR HAVING IMPROVED CONTRAST CONTROL FOR A LIQUID CRYSTAL, TOUCH SENSITIVE DISPLAY", assigned to the IBM Corporation and incorporated herein by reference, now U.S. Pat. No. 5,422,656.

This patent application is also related to the copending U.S. patent application Ser. No. 07/976,127, filed Nov. 13, 1992, by Brent Beatty, et al., entitled "NAVIGATION APPLICATION FOR PERSONAL COMMUNICATOR", assigned to the IBM Corporation and incorporated herein by reference, now abandoned.

BACKGROUND OF THE INVENTION

It is widely recognized that digital communications technology and data processing technology are converging. One example of this is the development of portable personal computers that include telephone modems, enabling the transmission of digital information over public switched telephone networks (PSTN). Another example is the development of mobile radio telephones that use microprocessors executing stored programs for sampling and digitizing the voice signal, multiplexing the transmission of the digitized voice signal with other such voice signals, and digitally controlling the operations of the cellular telephone device.

The most recent evidence of the convergence of digital communications technology with digital personal computer technology, is the SIMON personal communications device described in the above identified patent applications. The SIMON personal communications device has many features within it to enable personal communications. The personal communications device provides a cellular telephone, a facsimile transmission and receiving capability, an electronic mail sending and receiving capability, and an electronic pager, a computer notepad, a computer address book, a computer calendar, and a computer calculator, all within a single compact portable package.

The SIMON personal communications device includes a central processing unit (CPU) that executes stored programmed instructions stored in electrically programmable read only memories (EPROM). The stored program instruction in the EPROM's include basic input output operating system (BIOS) programs, and application programs to perform the functions of cellular telephony, public switched telephone network (PSTN) telephony, facsimile transmission and reception, electronic mail, pager functions, computer notepad functions, computer address book functions, computer calendar functions, and computer calculator functions. These stored programs are selectively accessed for execution by the CPU.

The SIMON personal communications device also includes a liquid crystal display having a touch overlay membrane, to enable the user to input keyboard entries or sketches by tactile pressure with a finger or proximity with a stylus. One example of a touch overlay membrane input device is described in U.S. Pat. No. 4,686,332 by Evon Greanias, et al., entitled "Combined Finger Touch and Stylus Detection System for Use on the Viewing Surface of a Visual Display Device", assigned to the IBM Corporation and incorporated herein by reference.

The storage capacity of the RAM can be augmented by employing supplementary memory in the form of a personal computer memory card (PCMCIA) (Trademark of the Personal Computer Memory Card International Association). The personal computer memory card can include extra RAM to supplement the RAM storage in the personal communications device, by plugging the personal computer memory card into a PCMCIA receptacle slot in the personal communications device.

The LCD screen presents menu images to the user to enable the selection of communications applications such as telephone, facsimile (FAX), or electronic mail (E-mail). For each of these applications, a corresponding keypad and presentation area is displayed. The user has the option of employing either a public switched telephone network link or a cellular telephone network link for any of these communications applications. However, the functions required to be performed in order to send or receive a cellular telephone network call are different from the functions required for a call over a public switched telephone network.

All cellular telephones use two-way radio communications controlled by the cellular telephone network. The ambient atmospheric and geographic conditions can affect the strength of the transmitted signal. When transmitting a large amount of data during a FAX or an E-mail session, an acceptable signal strength is required to ensure that data is not lost and to keep the transmission error-free. A signal strength indicator is required on cellular telephones to enable the user to monitor the signal strength and change its location to improve it. Further, a cellular telephone must be registered with the home region it usually employs as the base for its communications. If the cellular telephone is transported outside of its home region, it becomes a roamer, and a different mode of operation called roaming, is carried out. A cellular telephone must provide an indication to the user as to its current mode of operation, either home or roaming. Such concerns are absent from calls using a public switched telephone network.

Users prefer consistency in the appearance and use of menus, keys and displays needed to operate a multiple application device such as the SIMON personal communications device. What is needed is a means to provide a consistent user interface for a multiple application personal communications device, that also provides the customized interface features necessary to enable the user to interact with the selected communications medium, either a public switched telephone network or a cellular telephone network.

OBJECTS OF THE INVENTION

It is therefore an object of the invention to provide an improved user interface for a multiple application personal communications device.

It is another object of the invention to provide a consistent user interface for a multiple application personal communications device, that adapts to the unique requirements of the selected communications link.

It is a further object of the invention to provide adaptive user interface for a multiple application personal communications device for communication over both public switched telephone networks and cellular telephone networks.

SUMMARY OF THE INVENTION

These and other objects, features and advantages are accomplished by the method and apparatus for consistent user interface disclosed herein.

The invention is used in a personal communications device that includes a memory that stores the operating system programs and the applications programs for execution by a central processing unit (CPU) in the device. The programs selectively manage the operations of a cellular telephone, a facsimile receiver, a touch overlay input and display, and several desktop functions such as a calendar, notepad, and electronic mail.

The device is capable of performing many types of communications functions that require a variety of communications links. In addition to the radio link provided for cellular telephony, the device must be able to connect to a conventional RJ11 telephone jack for public switched telephone service, to an RS232 serial data connector, to diagnostic cables, to external keyboards, and to hands-free microphones and speakers. To consolidate these connection requirements, an option attach connector is provided for the device. The option attach connector includes three programmable indicator bits that indicate to the device, the role the connector is playing when it is connected to the device.

In accordance with the invention, the option attach connector has a first indicator bit combination that alerts the device that a public switched telephone network connection has been made to it. The presence of the first indicator bit combination is a signal to the device that telephone, FAX, and E-mail communications applications are to be conducted over a PSTN link.

In accordance with the invention, the presence of the first indicator bit combination invokes the stored computer program to display images of menus, keypads, and visual presentations on the LCD display that are consistent with a basic display layout for both cellular telephone network and PSTN modes, but that include customized presentation features that are unique to the PSTN mode of communications.

Further in accordance with the invention, the presence of a second indicator bit combination different from the first indicator bit combination invokes the stored computer program to display corresponding images of menus, keypads, and visual presentations on the LCD display that are consistent with the basic display layout for both cellular telephone network and PSTN modes, but that include customized presentation features that are unique to the cellular telephone network mode of communications.

The presence of the predetermined indicator bit combinations also invokes the stored computer program to provide appropriate connections between the PSTN link or the cellular telephone network and the telephone, FAX, and modem hardware in the device.

In this manner, consistent user interface is provided for a multiple application personal communications device, that adapts to the unique requirements of the selected communications link.

DESCRIPTION OF THE FIGURES

These and other objects, features and advantages will be more fully appreciated with reference to the accompanying figures.

FIGS. 2A to 2H are a schematic diagrams of several embodiments of the option attach connector.

FIGS. 4A to 4D are a flow diagram of the method to provide a consistent user interface in a multiple feature personal communications device.

DISCUSSION OF THE PREFERRED EMBODIMENT

Figure 1A:
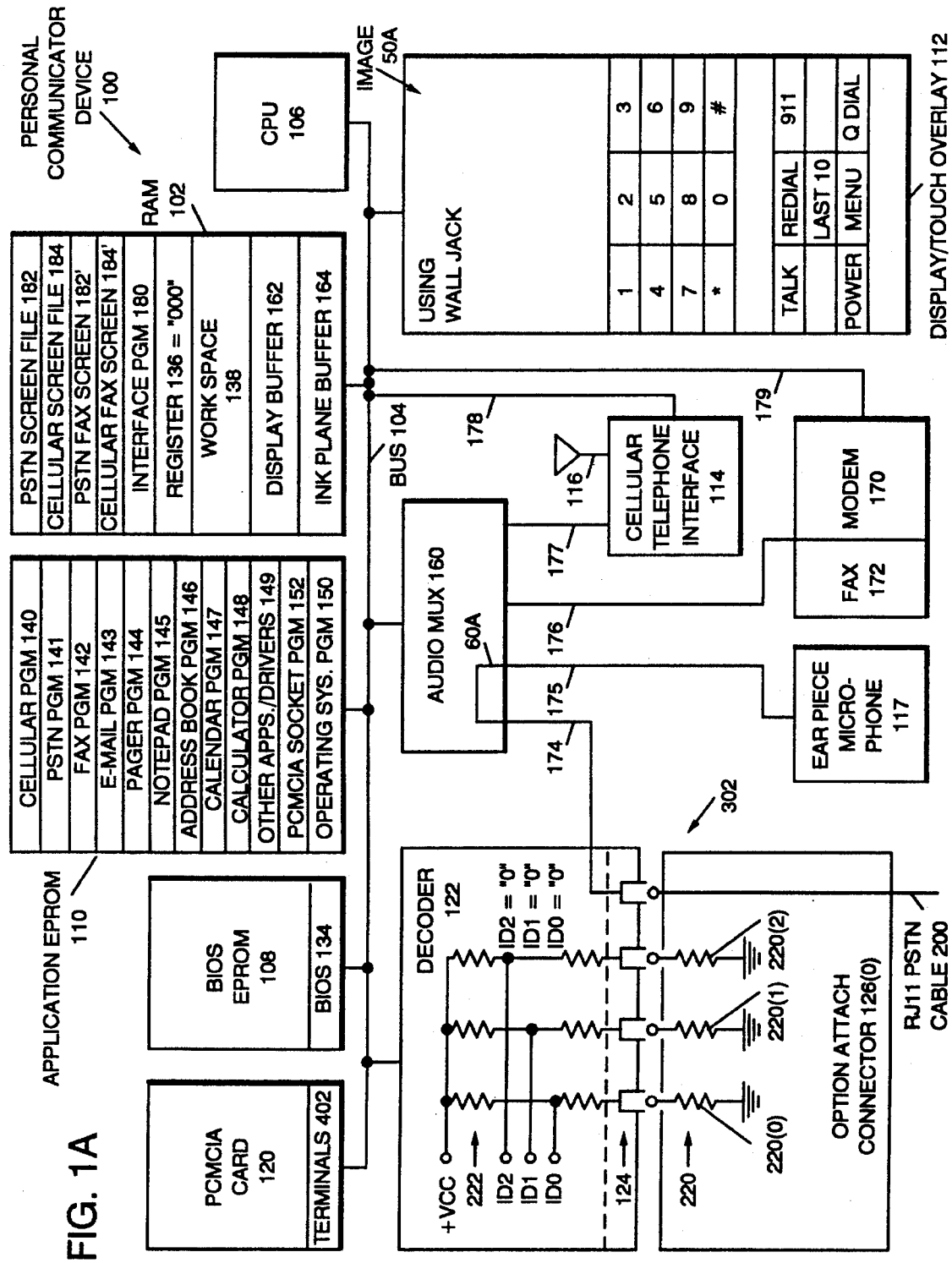
FIG. 1A is an overall functional block diagram of the personal communications device, connected to a PSTN option attach connector for voice communications over a PSTN, in accordance with the invention.
Figure 5A:
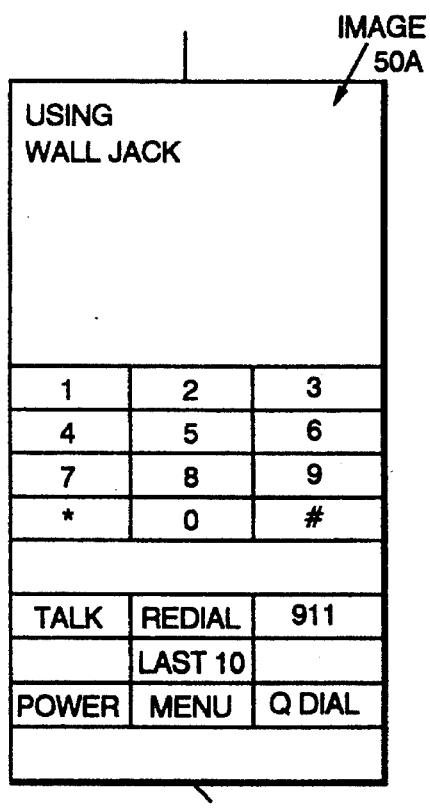
FIG. 5A is an illustration of the appearance of the image 50A displayed on the display/touch overlay 112, for voice communications over a PSTN.

The personal communication system diagram of FIG. 1A shows the personal communications device 100. The device 100 includes the RAM 102 which is connected by means of the bus 104 to the CPU 106, which executes the stored program instructions in the RAM 102. RAM 102 contains the ink plane buffer 164 used by the touch overlay membrane to store pels of registered contact points by the user's finger of stylus. RAM 102 contains the display buffer for the LCD display 112. Screen images, such as image 50A in FIG. 1A and FIG. 5A, are represented by a bit map stored in the display buffer 162, that displays the bit map as the image 50A, for example on the display 112. The work space 138 in RAM 102 is used by the operating system program 150 and BIOS 134, as well as by application programs running in the device 100.

Register 136 stores the option value that is decoded by the decoder 122 from the resistor array 220 in the option attach connector 126(0). The interface program 180, stored in RAM 102, reads the option value stored in register 136 and in response, sends control signals to the audio MUX to configure the connections 60A, for example, between the option attach connector 126(0) and the ear piece and microphone 117. This is described in the flow diagram of FIGS. 4A to 4D.

Figure 6:
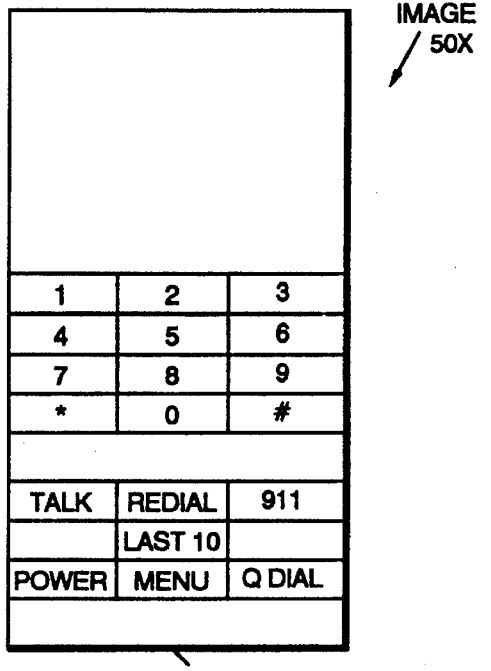
FIG. 6 illustrates the layout of the master image 50X produced by the interface program 180.

The interface program 180 also controls the display of images such as 50A on the display 112, in response to reading the option value stored in the register 136. This is described in the flow diagram of FIGS. 4A to 4D. FIG. 6 illustrates the layout of the master image 50X produced by the interface program 180. When the interface program generates the PSTN telephone function image 50A, for example, it accesses the PSTN screen file 182 in RAM 102 which contains the layout of the PSTN customizing image 50Y shown in FIG. 6A. The interface program 180 combines the PSTN customizing image 50Y with the master image 50X of FIG. 6, to produce the composite image 50A of FIG. 1A and FIG. 5A, as it is displayed on the display/touch overlay 112, for voice communications over a PSTN.

Figure 1B:
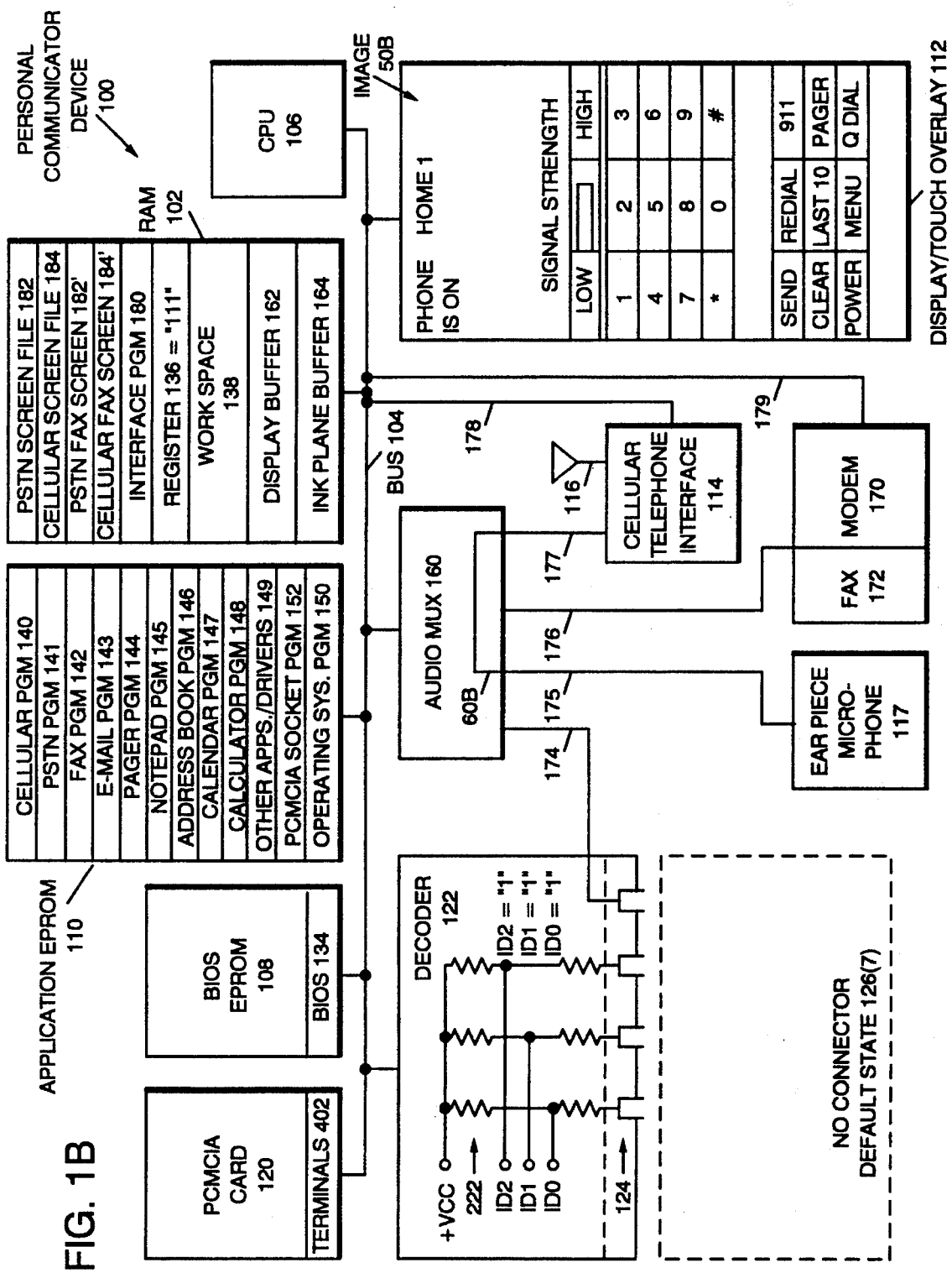
FIG. 1B is an overall functional block diagram of the personal communications device, in a cellular telephone network mode, for voice communications over a cellular telephone network, in accordance with the invention.
Figure 5B:
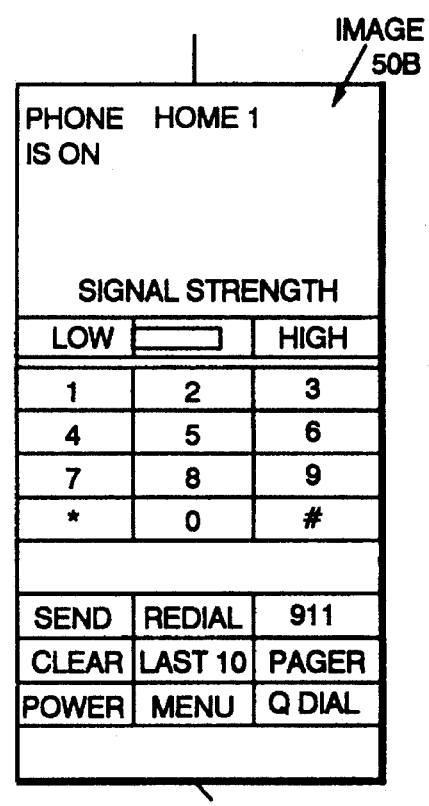
FIG. 5B is an illustration of the appearance of the image 50B displayed on the display/touch overlay 112, for voice communications over a cellular telephone network.

The RAM 102 also stores the cellular screen file 184, that contains the layout of the cellular customizing image 50Z, that when combined with the master image 50X of FIG. 6 by the interface program 180, produces the image 50B of FIG. 1B and FIG. 5B, as it is displayed on the display/touch overlay 112, for voice communications over the cellular telephone network in FIG. 1B. The audio MUX in FIG. 1B selectively configures the connection 60B connecting the ear piece and microphone 117 to the cellular telephone interface 114.

Figure 1C:
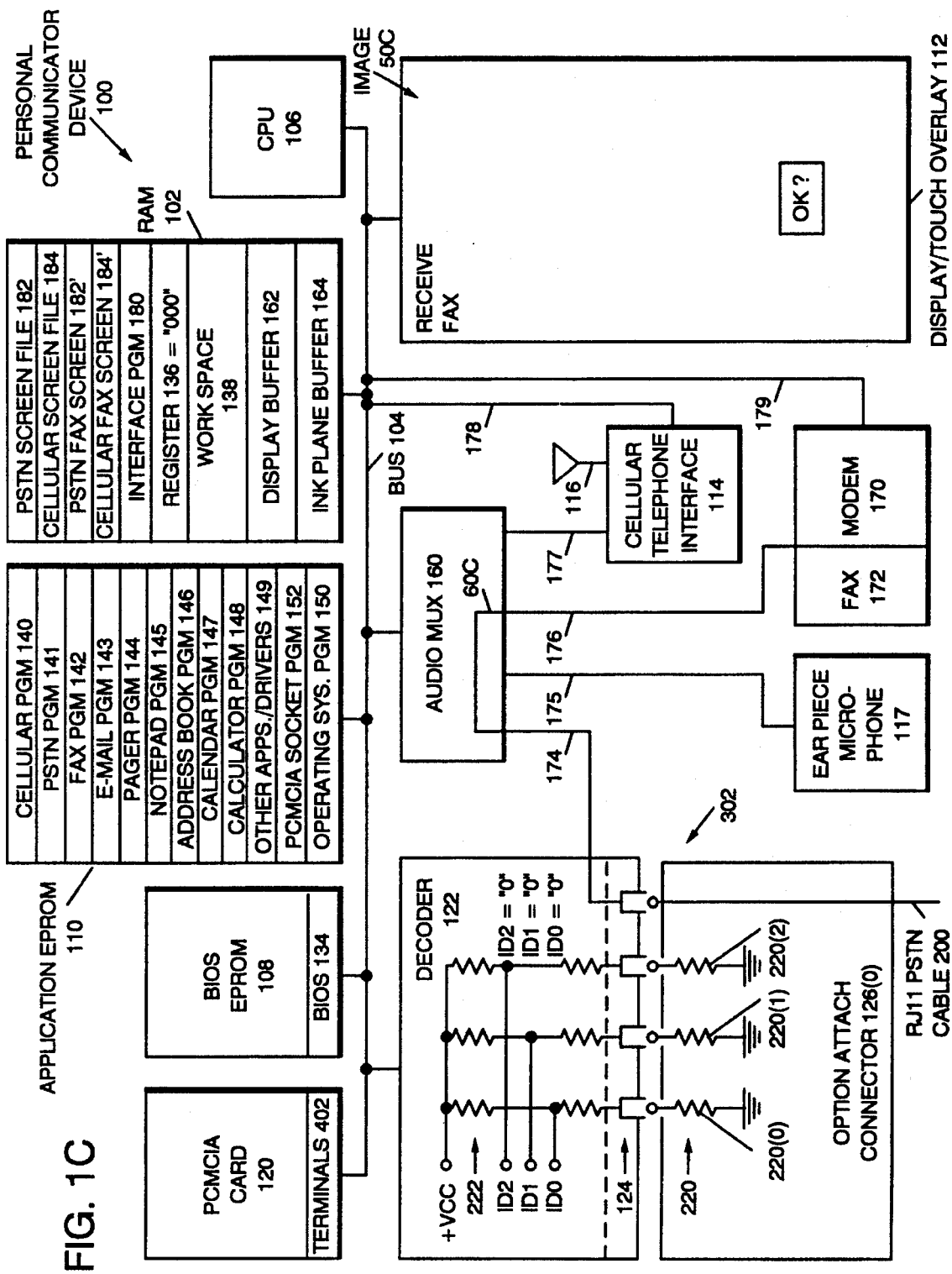
FIG. 1C is an overall functional block diagram of the personal communications device, connected to a PSTN option attach connector for FAX communications over a PSTN, in accordance with the invention.
Figure 5C:
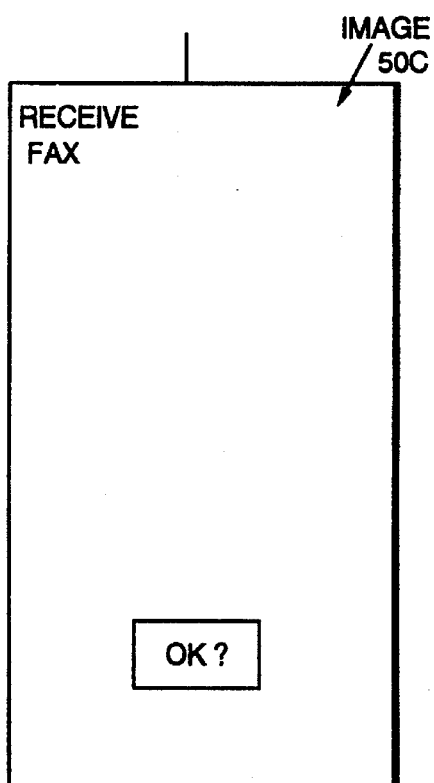
FIG. 5C is an illustration of the appearance of the image 50C displayed on the display/touch overlay 112, for FAX communications over a PSTN.

The RAM 102 also stores the PSTN FAX screen file 182' that is used by the interface program 180 to produce the image 50C in FIG. 5C, which is an illustration of the appearance of the image 50C displayed on the display/touch overlay 112, for FAX communications over a PSTN in FIG. 1C. The audio MUX in FIG. 1C selectively configures the connection 60C connecting the FAX 172/modem 170 to the PSTN cable 200. FIG. 5E is an illustration of the appearance of the image 50E displayed on the display/touch overlay 112, for E-MAIL communications over a PSTN. Its generation by the interface program 180 and the connections by the audio MUX 160 are the same as that for FIG. 1C.

Figure 1D:
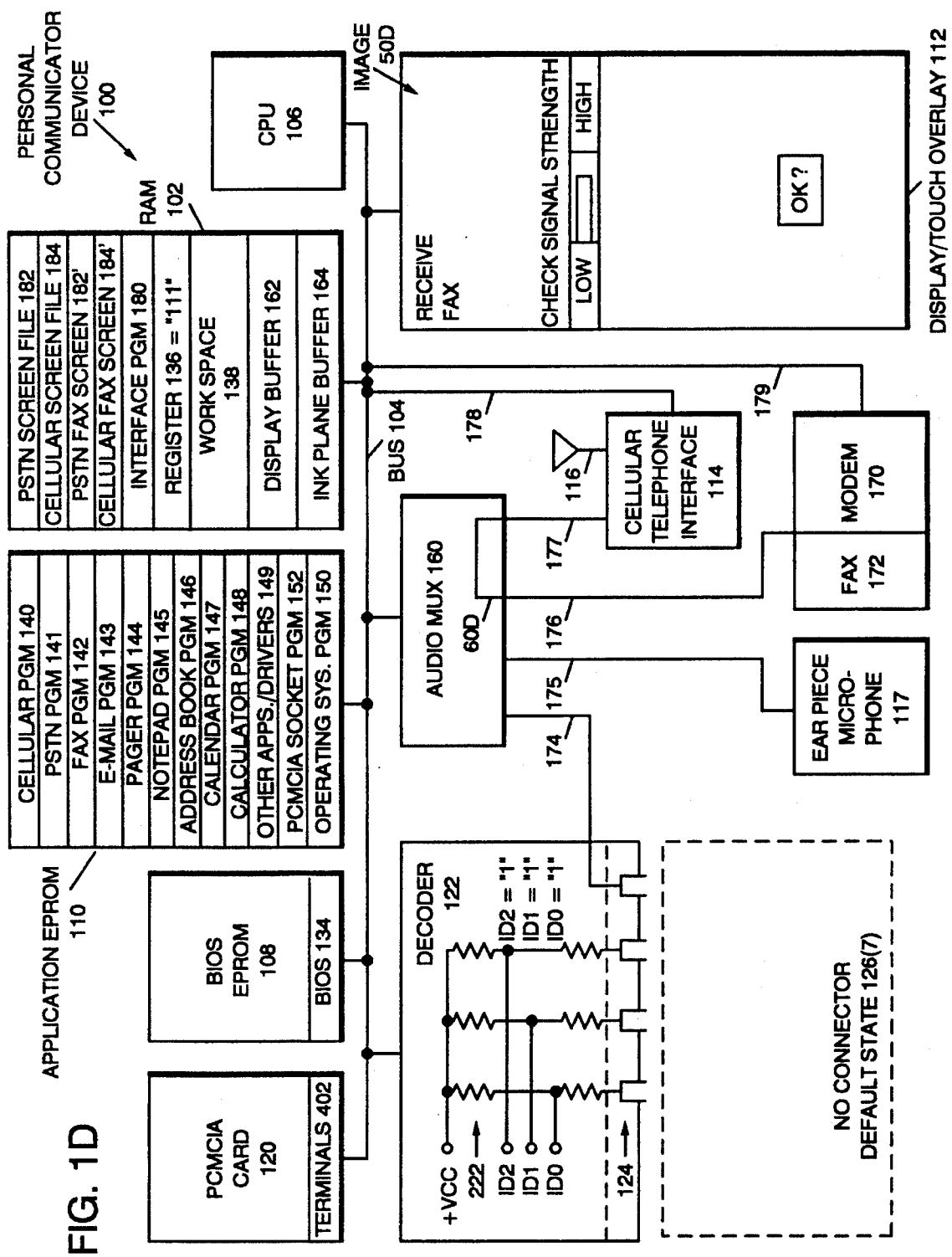
FIG. 1D is an overall functional block diagram of the personal communications device, in a cellular telephone network mode, for FAX communications over a cellular telephone network, in accordance with the invention.
Figure 1E:
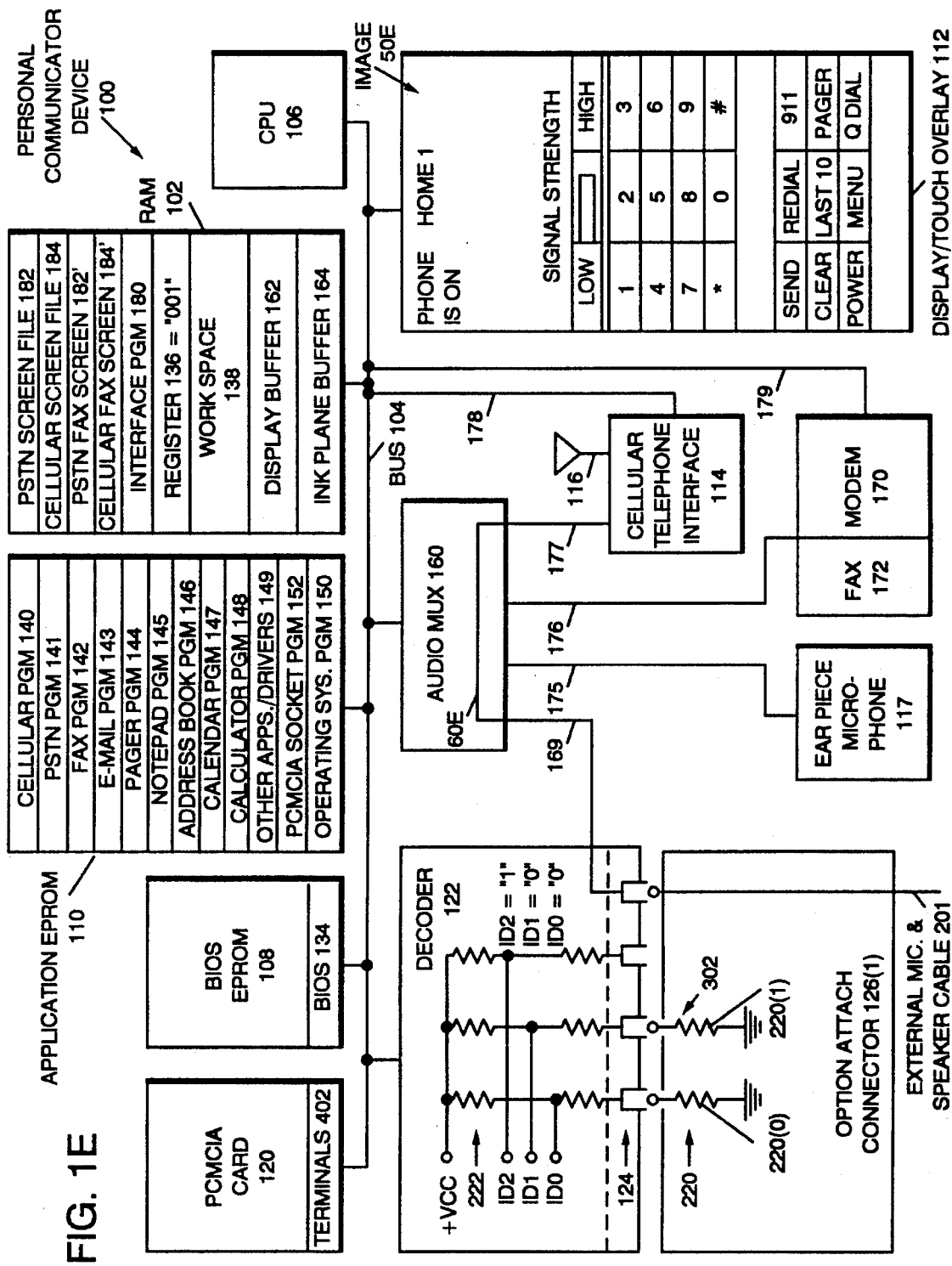
FIG. 1E is an overall functional block diagram of the personal communications device, connected to an external microphone and speaker cable option attach connector for voice communications over a cellular telephone network, in accordance with the invention.

The option attach connector 126(1) in FIG. 1E, connects the external microphone and speaker cable 201 over line 169 to the audio MUX 160. The resistor array 220 in the connector 126(1) provides a binary value of "001" as the option value stored in the register 136. In response to this option value, the audio MUX in FIG. 1E selectively configures the connection 60E connecting the external microphone and speaker cable 201 to the cellular telephone interface 114. The image 50B is displayed on the display 112, the same as is displayed in FIG. 1B for cellular telephone voice communications.

Figure 5D:
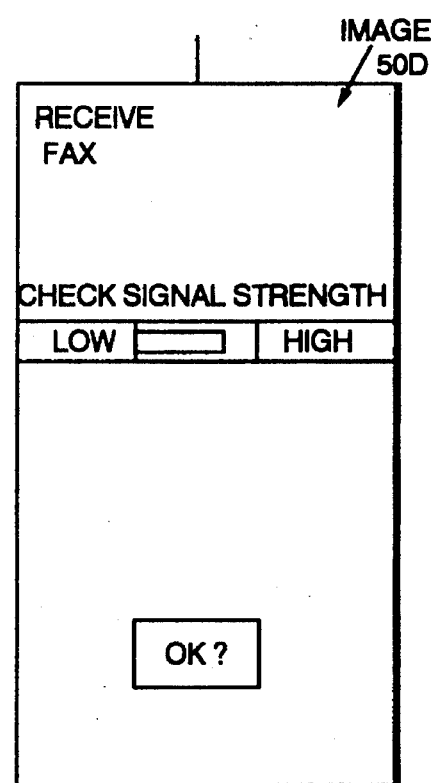
FIG. 5D is an illustration of the appearance of the image 50D displayed on the display/touch overlay 112, for FAX communications over a cellular telephone network.
Figure 5E:
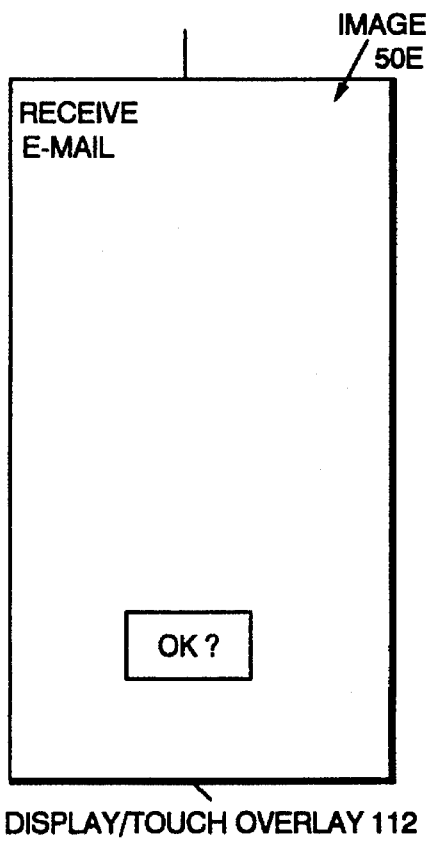
FIG. 5E is an illustration of the appearance of the image 50E displayed on the display/touch overlay 112, for E-MAIL communications over a PSTN.
Figure 5F:
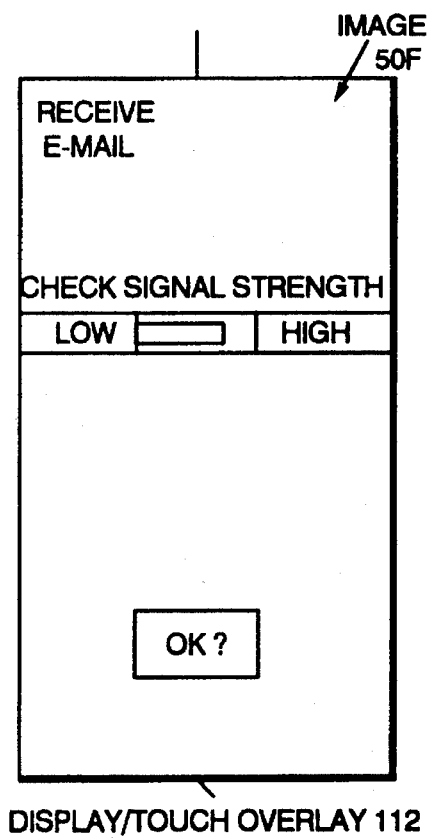
FIG. 5F is an illustration of the appearance of the image 50F displayed on the display/touch overlay 112, for E-MAIL communications over a cellular telephone network.

The RAM 102 also stores the cellular FAX screen file 184' that is used by the interface program 180 to produce the image 50D in FIG. 5D, which is an illustration of the appearance of the image 50D displayed on the display/touch overlay 112, for FAX communications over a cellular telephone network in FIG. 1D. The audio MUX in FIG. 1D selectively configures the connection 60D connecting the FAX 172/modem 170 to the cellular telephone interface 114. FIG. 5F is an illustration of the appearance of the image 50F displayed on the display/touch overlay 112, for E-MAIL communications over a cellular telephone network. Its generation by the interface program 180 and the connections by the audio MUX 160 are the same as that for FIG. 1D.

Also connected to the bus 104 in FIG. 1A, is the BIOS EPROM 108 which stores the basic input output operating system (BIOS) program 134 in 128 kbyte electrically programmable read only memory. Also connected to the bus 104 is the application EPROM 110 which stores application programs. Application programs stored in the application EPROM 110 can include the cellular telephone program 140, the public switched telephone network (PSTN) program 141, the facsimile program 142, the electronic mail (E-MAIL) program 143, the pager program 144, the notepad program 145, the address book program 146, the calendar program 147, the calculator program 148, and other applications and I/O driver programs 149. Also included in the application EPROM 110 is the operating system program 150. Also included in the application EPROM 110 is the PCMCIA card and socket services program 152. The programs stored in the BIOS 108 and the application EPROM 110, can be accessed for execution by the CPU 106.

The audio multiplexer (MUX) 160 in FIG. 1A, is connected to the bus 104, and accepts control signals from the CPU 106 to selectively interconnect lines 174, 175, 176, and 177. Line 174 is connected through the connector receptacle 124 to the RJ11 PSTN cable 200 in FIG. 1A. Line 175 is connected to the ear piece and microphone 117, that are an integral part of the personal communications device 100. Line 176 is connected to the modem 170 and FAX 172. Data and control signals are directly exchanged between the modem 170/FAX 172 and the CPU 106 over line 179. Line 177 is connected to the cellular telephone interface 114, shown with its radio antenna 116. Data and control signals are directly exchanged between the cellular telephone interface 114 and the CPU 106 over line 178. FIG. 1A shows the personal communications device 100, connected to a PSTN option attach connector 126(0) for voice communications over a PSTN cable 200.

In accordance with the invention, the option attach connector 126(0) has a first indicator bit combination "000" that alerts the device 100 that a public switched telephone network connection 200 has been made to it. The presence of the first indicator bit combination "000" is a signal to the device 100 that telephone, FAX, and E-mail communications applications are to be conducted over the PSTN cable 200. The presence of the first indicator bit combination "000" invokes interface stored computer program 180 to provide appropriate connections in the audio MUX 160, between the PSTN link 200 and the telephone, FAX, and modem hardware in the device. This is described in the flow diagram of FIGS. 4A to 4D. FIG. 1A shows the audio MUX controlled by the CPU 106 to connect line 174 to line 175 by means of connection 60A, connecting the ear piece and microphone 117 to the PSTN cable 200.

Figure 6A:
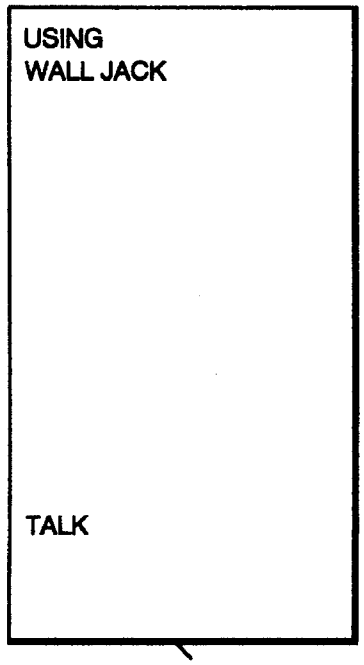
FIG. 6A illustrates the layout of the PSTN customizing image 50Y produced by the PSTN screen file 182, that when combined with the master image 50X of FIG. 6 by the interface program 180, produces the image 50A of FIG. 1A and FIG. 5A, as it is displayed on the display/touch overlay 112, for voice communications over a PSTN.
Figure 6B:
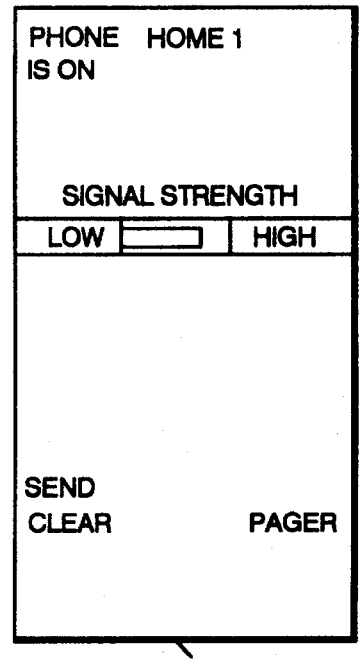
FIG. 6B illustrates the layout of the cellular customizing image 50Z produced by the cellular screen file 184, that when combined with the master image 50X of FIG. 6 by the interface program 180, produces the image 50B of FIG. 1B and FIG. 5B, as it is displayed on the display/touch overlay 112, for voice communications over a cellular telephone network.

Further in accordance with the invention, the presence of the first indicator bit combination "000" in FIG. 1A also invokes the stored interface computer program 180 to display images 50A of menus, keypads, and visual presentations on the LCD display 112 that are consistent with a basic display layout for master image 50X of FIG. 6 for both cellular telephone network and PSTN modes, but that include customized presentation features of the PSTN customizing image 50Y of FIG. 6A, that are unique to the PSTN mode of communications. FIG. 6 illustrates the layout of the master image 50X produced by the interface program 180. FIG. 6A illustrates the layout of the PSTN customizing image 50Y produced by the PSTN screen file 182, that when combined with the master image 50X of FIG. 6 by the interface program 180, produces the image 50A of FIG. 1A and FIG. 5A, as it is displayed on the display/touch overlay 112, for voice communications over the PSTN cable 200.

FIG. 1B is an overall functional block diagram of the personal communications device 100, in a cellular telephone network mode, for voice communications over a cellular telephone network, in accordance with the invention. There is no option attach connector in FIG. 1B, and the state of the decoder 122 is the default state with a binary value of "111" for the option value stored in the register 136. In response to this option value, the interface program 180 executes in the CPU 106. The CPU 106 sends control signals to the audio MUX 160 to make the connection 60B between the ear piece and microphone 117 on line 175 and the cellular telephone interface 114 on line 177. This is described in the flow diagram of FIGS. 4A to 4D.

Also connected to the bus 104 is PCMCIA receptacle slot 118 which is adapted to receive the personal computer memory card 120. The personal computer memory card is a PCMCIA standard card as specified in the publication "PC Card Standard", release 2.0, published by Personal Computer Memory Card International Association, September 1991. The PCMCIA card and socket services program 152 manages the interface between the CPU 106 and the personal computer memory card 120. The PCMCIA card and socket services program 152 is described in greater detail in the publication "Socket Services Interface Specification", release 1.0, published by the Personal Computer International Association, September 1991. The personal computer memory card 120, can include extra RAM storage to perform functions such as backup and restore, and to save facsimile images received by the system 100. The personal computer memory card 120 can also include a read only memory (ROM) which has stored in it other pre-stored information such as a metropolitan phone directory. The personal computer memory card 120 can be configured as a reprogramming card for the personal communications device 100. The reprogramming card can contain pre-stored new programs that are to be loaded into the EPROM's 108 and/or 110.

Also connected to the bus 104 is the liquid crystal display (LCD) and touch overlay 112, and the cellular telephone interface 114 with its antenna 116.

The device 100 is capable of performing many types of communications functions over a variety of communications links. In addition to the radio link provided by the cellular telephone interface 114 and its antenna 116, the device 100 must be able to connect to a conventional RJ11 telephone jack for public switched telephone service. The device 100 must also be able to connect to a RS232 serial data connector for data communications applications. The device 100 must also be able to connect to diagnostic cables for diagnosing the operation of the device 100. The device 100 must also be able to connected to an external keyboard when desired. The device must also be able to connect to hands-free microphone and speaker to enable the user to speak on the telephone without having to handle the ear piece and microphone 117 units in the device 100. The ear piece and microphone 117 are an integral part of the personal communications device 100.

To consolidate the connection requirements for the device 100, the option attach connector 126 and its 33 pin receptacle 124 are coupled to the bus 104 through the decoder 122. The option attach connector 126, shown in greater detail in FIGS. 2A to 2H and in FIG. 3, includes three programmable indicator bits that indicate to the device 100, the role that the option attach connector 126 is playing when it is connected through the receptacle 124 to the decoder 122 and the bus 104.

In accordance with the invention, the option attach connector 126(0) has one indicator bit combination shown in FIG. 1A that alerts the device 100 that the PSTN connector cable 200 is connected to the device 100.

FIGS. 2A to 2H show the eight different option attach connector configurations when three ID bits ID0, ID1, and ID2 are used to configure the connector 126. The binary value of each ID bit ID0, ID1, or ID2 is established by the presence or absence of resistors 220(0), 220(1), or 220(2), respectively, each of which serves as a pull down resistor when connected to the circuit 222 of the decoder 122. For example, if there are no resistors 220 present for the three ID values ID0, ID1 and ID2, this corresponds to a default condition of FIG. 2H where no cable is attached to the connector 126(7). This is shown by the dotted out-line for 126(7) shown in FIG. 2H which corresponds to the binary value "111" for ID0, ID1, and ID2. This is applied in FIGS. 1B and 1D.

When the option attach connection 126 is configured in FIG. 2G to be the reprogramming option connection 126(6), then a single resistor 220(2) corresponds to the ID2 bit. This produces a binary value of ID0, ID1, and ID2 of "110", which signals to the decoder 122 that the reprogramming option connector 126(6) is connected to the receptacle 124 of the decoder 122. Reference can be made to the above identified Allard, et al. patent application for additional description of this feature.

If the single resistor 220(1) is in the ID1 bit position, as shown in FIG. 2F, then the option attach connector is configured as 126(5) which indicates that a diagnostic cable 205 is attached to the connector.

If two resistors 220(1) and 220(2) are connected in the option attach connector 126 at the ID1 and ID2 positions, as shown in FIG. 2E, this corresponds to ID0, ID1, and ID2 equalling a binary "100", which indicates that a personality transfer cable 204 is attached to the connector 126(4).

In FIG. 2D, if a single resistor 220(0) is placed at the ID0 position, then ID0, ID1, and ID2 equalling a binary "011" is created, which corresponds to the connector 126(3), indicating that an external keyboard cable 203 is attached to the connector 126(3).

If two resistors 220(0) and 220(2) are placed at the ID0 and ID2 positions, as shown in FIG. 2C, then this corresponds to the connector 126(2), which means that an RS232 interface cable 202 is attached to the connector 126(2).

In FIG. 2B, if two resistors 220(0) and 220(1) are placed at the ID0 and ID1 positions, this corresponds to the connector 126(1) which has ID0, ID1, and ID2 equalling a binary value of "001", which means that an external microphone and an external speaker are attached by cable 201 to the connector 126(1). This is applied in FIG. 1E.

Finally, if all three resistors 220(0), 220(1), and 220(2) are placed at the ID0, ID1 and ID2 positions, as shown in FIG. 2A, this corresponds to the connector 126(0), which indicates that a RJ11 cable is attached at 200, for public switched telephone network operations. The cable 200 is attached to the connector 126(0). This is applied in FIGS. 1A and 1C.

Figure 3:
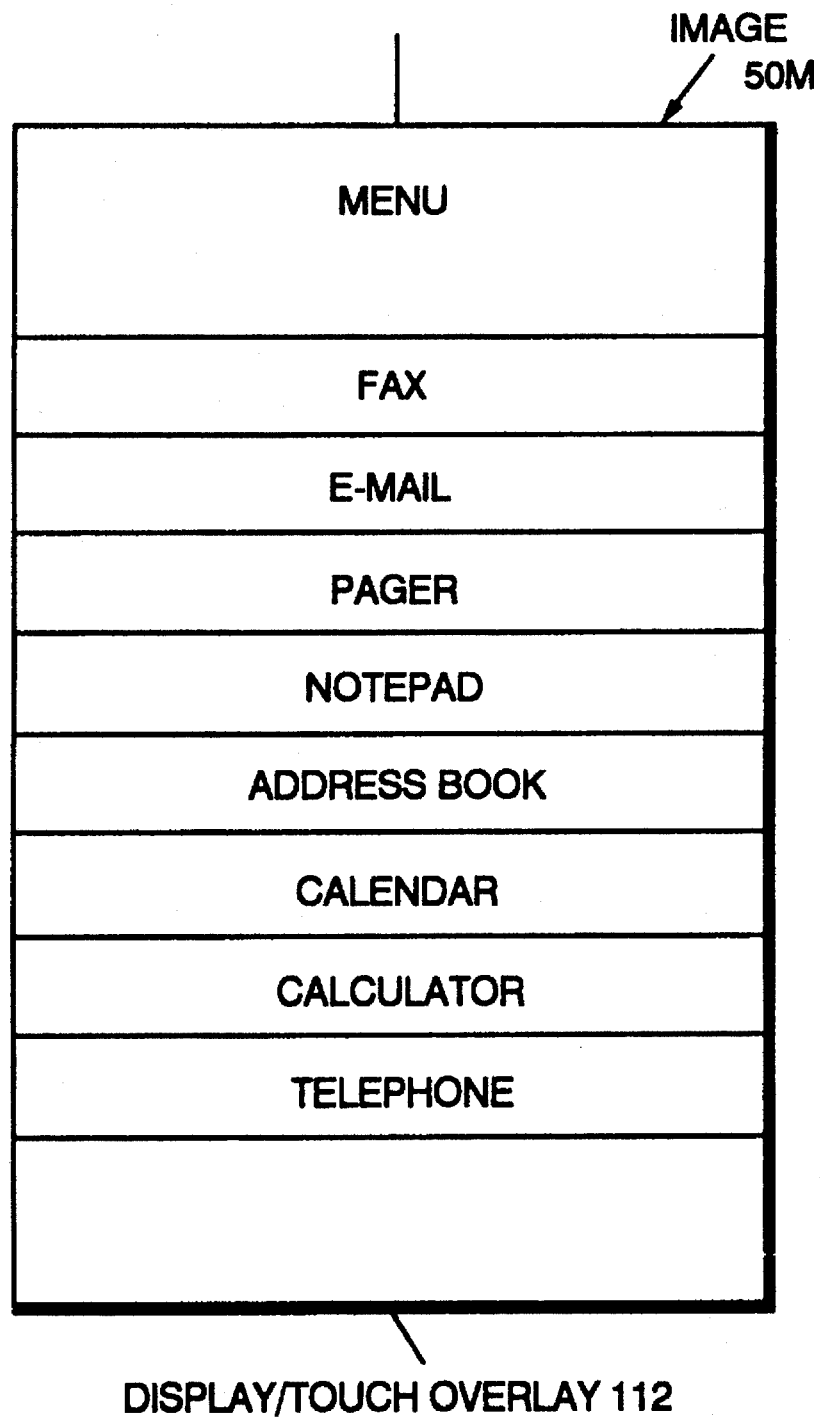
FIG. 3 is an illustration of the appearance of the menu image 50M displayed on the display/touch overlay 112.

FIG. 3 is an illustration of the appearance of the menu image 50M displayed on the display/touch overlay 112. The menu image 50M presents the user with communication application options such as voice communications, FAX communications, or E-MAIL communications. The user selects one of the communications applications by touching the touch overlay membrane overlying the displayed application option. The selected application identity is then stored in the work space 138 of the RAM 102, to be used by the interface program 180, as described in the flow diagram of FIGS. 4A to 4D.

FIGS. 4A to 4D are a flow diagram of the method to provide a consistent user interface in a multiple feature personal communications device.

Figure 4A:
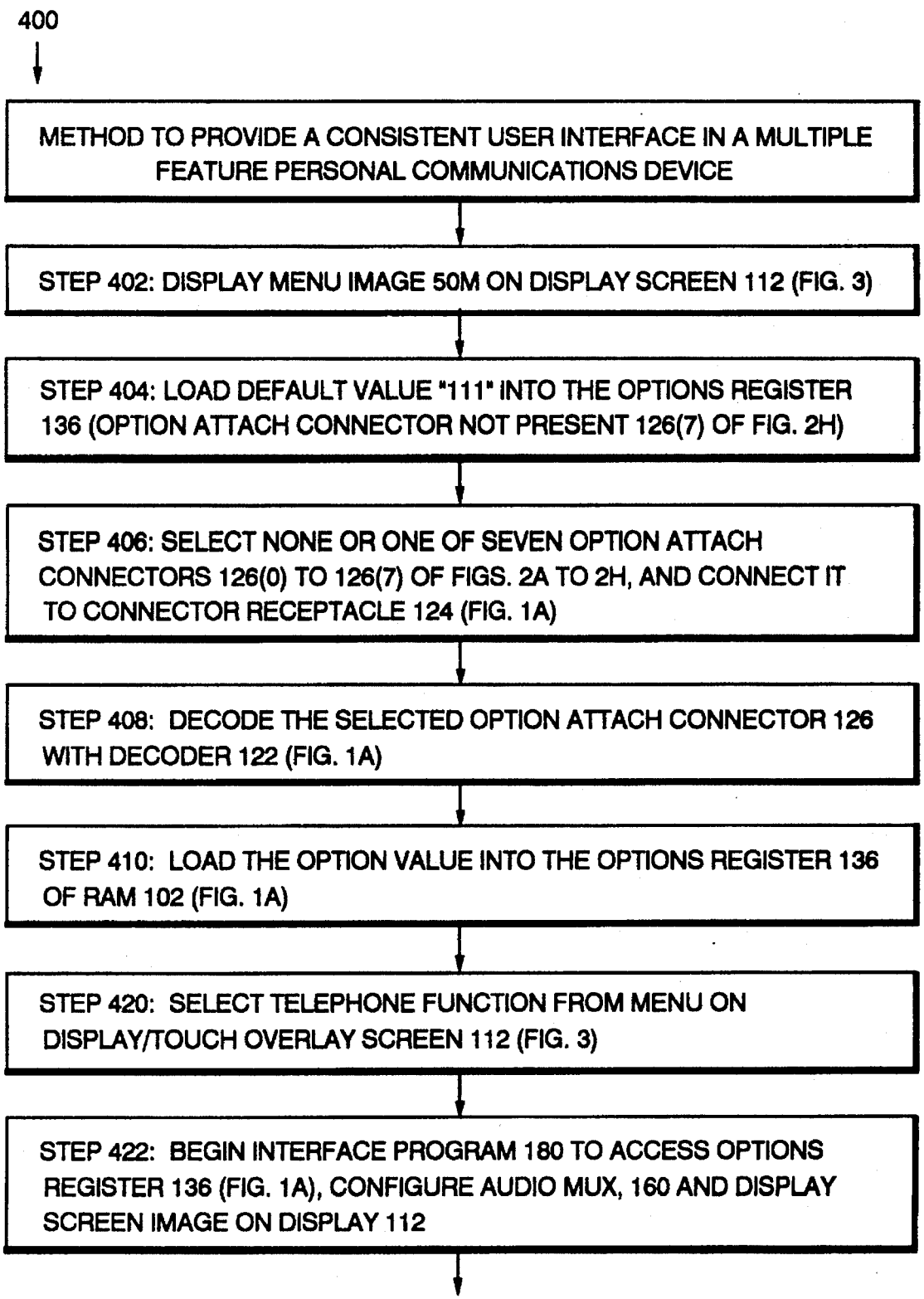

FIG. 4A shows method 400 to provide a consistent user interface in a multiple feature personal communications device. The steps are as follows:

Step 402: display menu image 50M on display screen 112 (FIG. 3).

Step 404: Load default value "111" into the options register 136 (option attach connector not present 126(7) of FIG. 2H).

Step 406: Select none or one of seven option attach connectors 126(0) to 126(7) of FIGS. 2A to 2H, and connect it to connector receptacle 124 (FIG. 1A).

Step 408: Decode the selected option attach connector 126 with decoder 122 (FIG. 1A).

Step 410: load the option value into the options register 136 of RAM 102 (FIG. 1A).

Step 420: Select telephone function from menu on display/touch overlay screen 112 (FIG. 3).

Step 422: Begin interface program 180 to access options register 136 (FIG. 1A), configure audio MUX, 160 and display screen image on display 112.

Step 424: If option value in options register="000" (FIG. 1A) (Corresponding to PSTN cable connector 126(0)), Then configure the audio MUX 160 for path 60A to connect ear piece/microphone 117 from line 175 to line 174 and thru option attach connector 126(0) to the RJ11 PSTN cable 200.

Step 426: access PSTN screen image file 182 and display PSTN phone screen image 50A on display 112 (FIG. 5A).

FIG. 4B continues the flow diagram of method 400. The steps are as follows:

Step 428: If option value in options register="111" (FIG. 1B) (Corresponding to no connector default state 126(7)), Then configure the audio MUX 160 for path 60B to connect ear piece/microphone 117 from line 175 to line 177 to cellular telephone 114.

Step 430: Access cellular screen image file 184 and display cellular phone screen image 50B on display 112 (FIG. 5B).

Step 432: If option value in options register="001" (FIG. 1E) (Corresponding to external microphone and speaker connector 126(1)), Then configure The audio MUX 160 for path 60E to connect external microphone and speaker cable 210 thru connector 126(1) and line 169 to line 177 to cellular telephone interface 114.

Step 434: access cellular screen image file 184 and display cellular phone screen image 50B on display 112 (FIG. 5B).

Figure 4C:
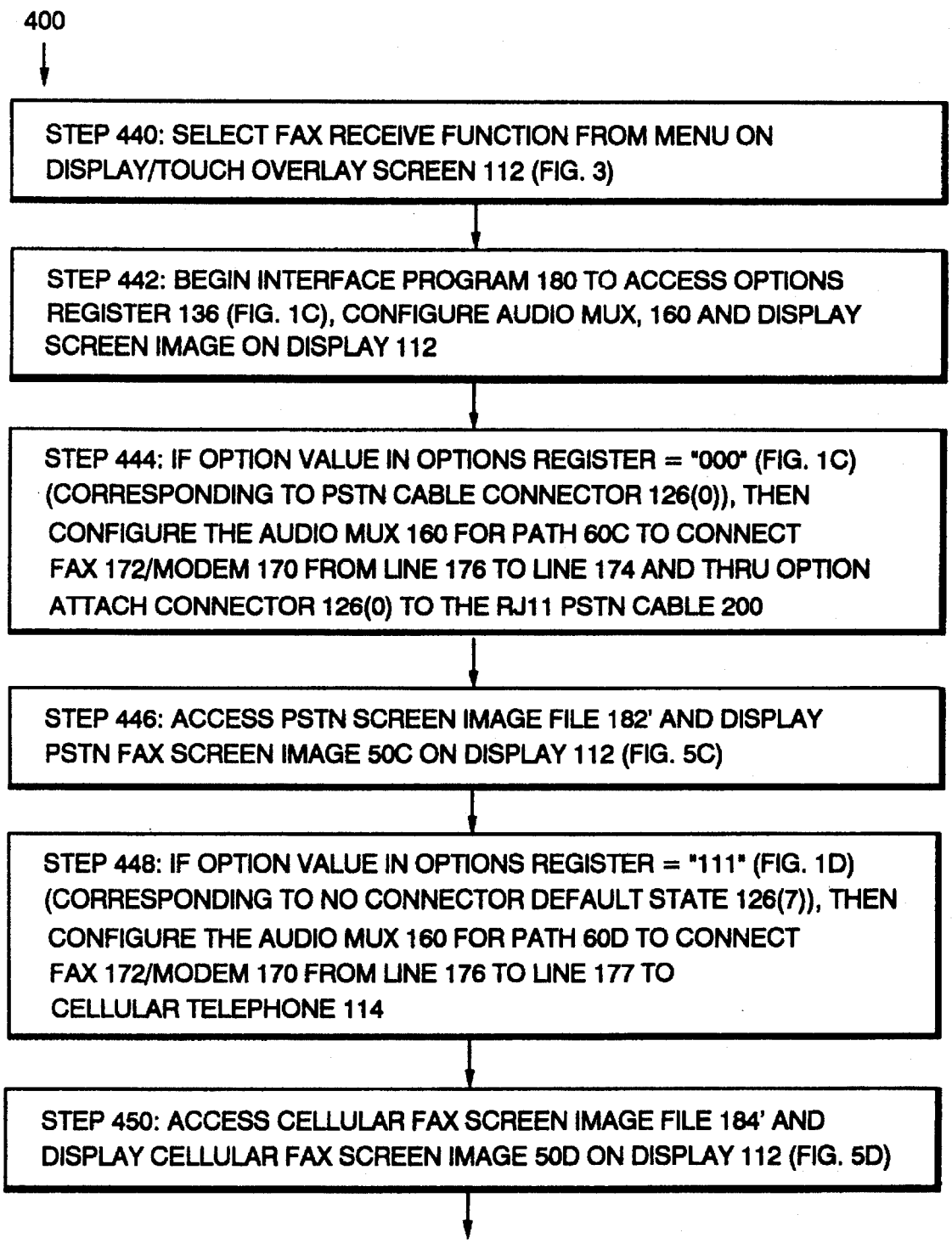

FIG. 4C continues the flow diagram of method 400. The steps are as follows:

Step 440: Select FAX receive function from menu on display/touch overlay screen 112 (FIG. 3).

Step 442: Begin interface program 180 to access options register 136 (FIG. 1C), configure audio MUX, 160 and display screen image On display 112

Step 444: If option value in options register="000" (FIG. 1C) (Corresponding to PSTN cable connector 126(0)), Then configure The audio MUX 160 for path 60C to connect FAX 172/modem 170 from line 176 to line 174 and thru option attach connector 126(0) to the RJ11 PSTN cable 200.

Step 446: Access PSTN screen image file 182' and display PSTN FAX screen image 50C on display 112 (FIG. 5c).

Step 448: If option value in options register="111" (FIG. 1D) (Corresponding to no connector default state 126(7)), Then configure the audio MUX 160 for path 60D to connect FAX 172/modem 170 from line 176 to line 177 to cellular telephone 114.

Step 450: Access cellular FAX screen image file 184' and display cellular FAX screen image 50D on display 112 (FIG. 5D). FIG. 4D continues with the flow diagram of method 400. The steps are as follows:

Step 460: Select E-MAIL receive function from menu on display/touch overlay screen 112 (FIG. 3).

Step 462: Begin interface program 180 to access options register 136 (FIG. 1C), configure audio MUX, 160 and display screen image On display 112.

Step 464: If option value in options register="000" (FIG. 1C) (Corresponding to PSTN cable connector 126(0)), Then configure the audio MUX 160 for path 60C to connect modem 170 from line 176 to line 174 and thru option attach connector 126(0) to the RJ11 PSTN cable 200.

Step 466: Access PSTN screen image file and display PSTN E-MAIL screen image 50E on display 112 (FIG. 5E).

Step 468: If option value in options register="111" (FIG. 1D) (Corresponding to no connector default state 126(7)), Then configure the audio MUX 160 for path 60D to connect modem 170 from line 176 to line 177 to cellular telephone interface 114.

Step 470: Access cellular E-MAIL screen image file & display cellular E-MAIL screen image 50F on display 112 (FIG. 5F).

The method then returns to the main program. The method 400 is carried out primarily through the execution of program instructions stored in the RAM 102 and executed by the CPU 106.

Although a specific embodiment of the invention has been disclosed, it will be understood by those having skill in the art, that changes can be made to the specific embodiment without departing from the spirit and the scope of the invention.

What is claimed is:

1. A system for providing a consistent user interface in a self-contained multiple application personal communications device, comprising:

a mobile radio telephone in the device;

a data storage in the device, for storing program instructions;

a bus means in the device, coupled to said data storage;

a data processor in the device, coupled to said data storage over said bus means, for executing said stored program instructions;

a data display screen in the device, coupled to said data processor, for displaying information;

a program means stored in the data storage, having a first portion for managing communications using a public switched telephone network and displaying a first interface image corresponding to public switched telephone communication on the display screen;

said program means having a second portion, for managing communications using said mobile radio telephone to connect to a network and for displaying a second interface image corresponding to mobile radio telephone communications on the display screen;

a decoding means coupled to the data processor and to the data storage, for selectively causing either said first portion or said second portion of said program means to be executed by the data processor;

an option connector receptacle coupled to said decoding means;

a first option attach connector having a terminal coupled to said public switched telephone network, for selective connection to said option connector receptacle;

a first connector identification means included with said first option attach connector, for identifying said first option attach connector to said decoding means when said first connector is connected to said receptacle, and in response thereto, said decoding means causing the execution of said first portion of said program means and the display of said first image;

said decoding means causing said second portion of said program means to be executed and the display of said second image when said first connector is not identified to said decoding means.

2. The system for providing a consistent user interface in a multiple application personal communications device of claim 1, which further comprises:

said first portion of said program means displaying a FAX application image for communication with a public switched telephone network as said first interface image on the display screen, in response to said first connector identification means included with said first option attach connector, identifying said first option attach connector to said decoding means when said first connector is connected to said receptacle.

3. A method for providing a consistent user interface in a self-contained multiple application personal communications device supporting both cellular and PSTN communication, comprising:

identifying that a first option attach connector is connected to a receptacle of the device, and in response thereto, causing an execution of a first portion of a program means corresponding to PSTN communication stored in the device;

displaying a corresponding first FAX interface image on a display screen with said first portion of said program means;

identifying an absence of the first option attach connector and in response thereto, causing a second portion of the program means corresponding to cellular communication to be executed;

displaying a corresponding second FAX interface image on the display screen with said second portion of said program means.

4. The system for providing a consistent user interface in a multiple application personal communications device of claim 3, which further comprises:

said first portion of said program means displaying an E-MAIL application image for communication with a public switched telephone network as said first interface image on the display screen, in response to said first connector identification means included with said first option attach connector, identifying said first option attach connector to said decoding means when said first connector is connected to said receptacle.

5. A method for providing a consistent user interface in a self-contained multiple application personal communications device for both cellular and PSTN communications, comprising:

identifying that a first option attach connector is connected to a receptacle of the device, and in response thereto, causing an execution of a first portion of a program means corresponding to PSTN communications stored in the device;

displaying a corresponding first E-MAIL interface image on a display screen with said first portion of said program means;

identifying an absence of the first option attach connector and in response thereto, causing a second portion of the program means corresponding to cellular communications to be executed;

displaying a corresponding second E-MAIL interface image on the display screen with said second portion of said program means.

6. A system for providing a consistent user interface in a self-contained multiple application personal communications device supporting mobile radio telephone and public switched telephone network communications that includes a data storage and a data processor, comprising:

a data display screen in the device, coupled to said data processor, for displaying information;

an input means, coupled to said data processor, for receiving communications application selection data;

a program means stored in the data storage, having a first portion for managing communications using a public switched telephone network and displaying a corresponding first interface image on the display screen;

said program means having a second portion, for managing communications using a mobile radio telephone network and displaying a corresponding second interface image on the display screen;

a decoding means coupled to the data processor and to the data storage, for selectively causing either said first portion or said second portion of said program means to be executed by the data processor;

a first option attach connector having a terminal coupled to said public switched telephone network, for selective coupling to said decoding means;

a first connector identification means included with said first option attach connector, for identifying said first option attach connector to said decoding means when said first connector is coupled to said decoding means, and in response thereto, said decoding means causing the execution of said first portion of said program means;

said data processor sending first control signals to said display means to display said first image corresponding to public switched telephone network communication in response to said identification of said first option attach connector and in response to said communications application selection data;

said decoding means causing said second portion of said program means corresponding to mobile radio telephone communications to be executed when said first connector is not coupled to said decoding means;

said data processor sending second control signals to said display means to display said second image in response to said first option attach connector not being coupled to said decoding means and in response to said communications application selection data.

7. The system of claim 6, wherein said communications application selection data is a voice communications selection.

8. The system of claim 6, wherein said communications application selection data is a FAX communications selection.

9. The system of claim 6, wherein said communications application selection data is an E-MAIL communications selection.

10. A method for providing a consistent user interface in a multiple application personal communications device that supports cellular and PSTN communications alternatively and includes a data storage and a data processor, comprising:

identifying a first option attach connector coupled to the device indicating PSTN communications and in response thereto, causing the execution of a first portion of a program means;

sending first control signals to a display means to display a first image characterizing PSTN communications in response to said identification of the first option attach connector and in response to communications application selection data;

causing a second portion of said program means to be executed when said first connector is not coupled to the device indicating cellular telephone communications;

sending second control signals to said display means to display a second image characterizing cellular telephone communications in response to said first option attach connector not being coupled to the device means and in response to said communications application selection data.

11. The method of claim 10, wherein said communications application selection data is a voice communications selection.

12. The method of claim 10, wherein said communications application selection data is a FAX communications selection.

13. The method of claim 10, wherein said communications application selection data is an E-MAIL communications selection.

14. The method of claim 10, which further comprises:

forming said first image from a master image and a PSTN communications characterizing image; and forming said second image from a master image and a cellular telephone communications characterizing image.

* * * * *